United States Patent [19]
Frank

[11] 3,744,329
[45] July 10, 1973

[54] MODULAR PULLEY CAPABLE OF BEING ASSEMBLED TO VARIOUS DESIRED LENGTHS AND AUTOMATIC BELT-STEERING PULLEY ASSEMBLY

[76] Inventor: Carl A. Frank, 624 Stanley Place, River Vale, N.J.

[22] Filed: June 9, 1972

[21] Appl. No.: 261,510

Related U.S. Application Data

[63] Continuation of Ser. No. 35,400, May 7, 1970, abandoned.

[52] U.S. Cl................................. 74/230.1, 74/241
[51] Int. Cl........................ F16h 55/42, F16h 7/18
[58] Field of Search.................... 74/230.1, 241, 240

[56] References Cited
UNITED STATES PATENTS

| | | | |
|---|---|---|---|
| 2,444,088 | 6/1948 | Becker | 74/230.1 X |
| 2,772,879 | 12/1956 | Lorig | 74/241 X |
| 3,029,655 | 4/1962 | Morrow | 74/241 |
| 2,352,474 | 6/1944 | Firth et al. | 74/230.1 |

Primary Examiner—Leonard Hall Gerin
Attorney—Roland T. Bryan, G. Kendall Parmelee et al.

[57] ABSTRACT

A modular pulley capable of being assembled to various desired lengths and automatic belt-steering pulley assembly. The modular pulley includes a plurality of interconnected hub units each having a cylindrically shaped body portion with male and female end surfaces integrally connected therewith. Each end surface has an axially aligned opening extending therethrough which is capable of receiving a shaft. One of the end surfaces has a male portion extending outwardly surrounding and adjacent to the opening. The other end surface has a female portion extending inwardly surrounding and adjacent to the other axially aligned opening. Further, the end surfaces have axially aligned fastening holes arranged therein for the interconnection of individual hub units with the male portion of one hub mating with the female portion of the preceding hub. The adjacent hubs are then bolted together to form an assembled pulley, with the tool doing the bolting gaining access to the bolt through another axially aligned hole. The assembled hub units provide a "flat," i.e. cylindrical pulley or roller of the desired length for use with a belt. When it is desired to provide automatic belt-steering action, end plates are mounted to the respective end hub units to form the ends of the pulley between which are mounted a plurality of resilient interlocking rings having effectively inclined peripheral ribs which are resiliently deflectable and serve to automatically center a belt passing over the pulley assembly.

12 Claims, 9 Drawing Figures

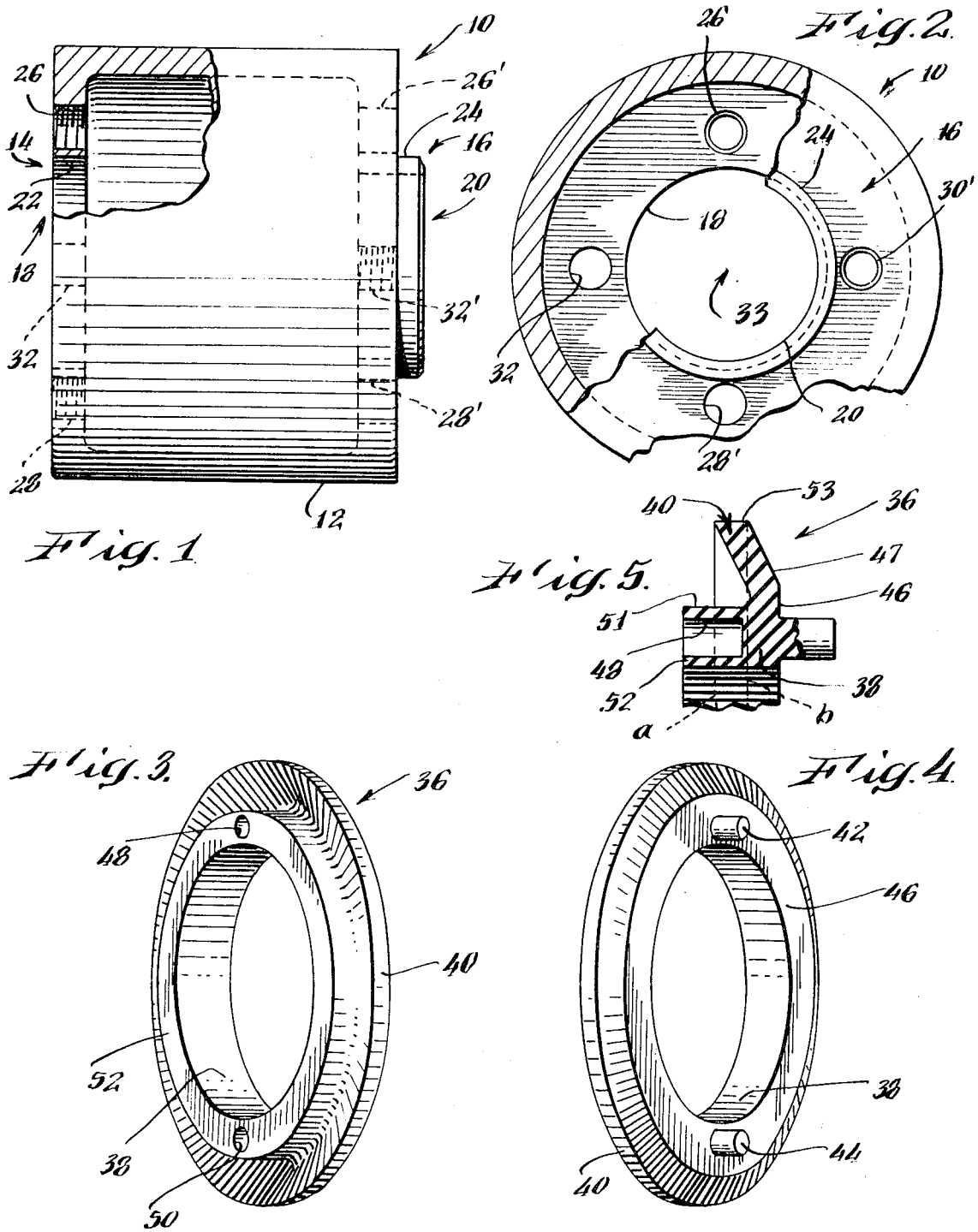

Patented July 10, 1973
3,744,329
3 Sheets-Sheet 2
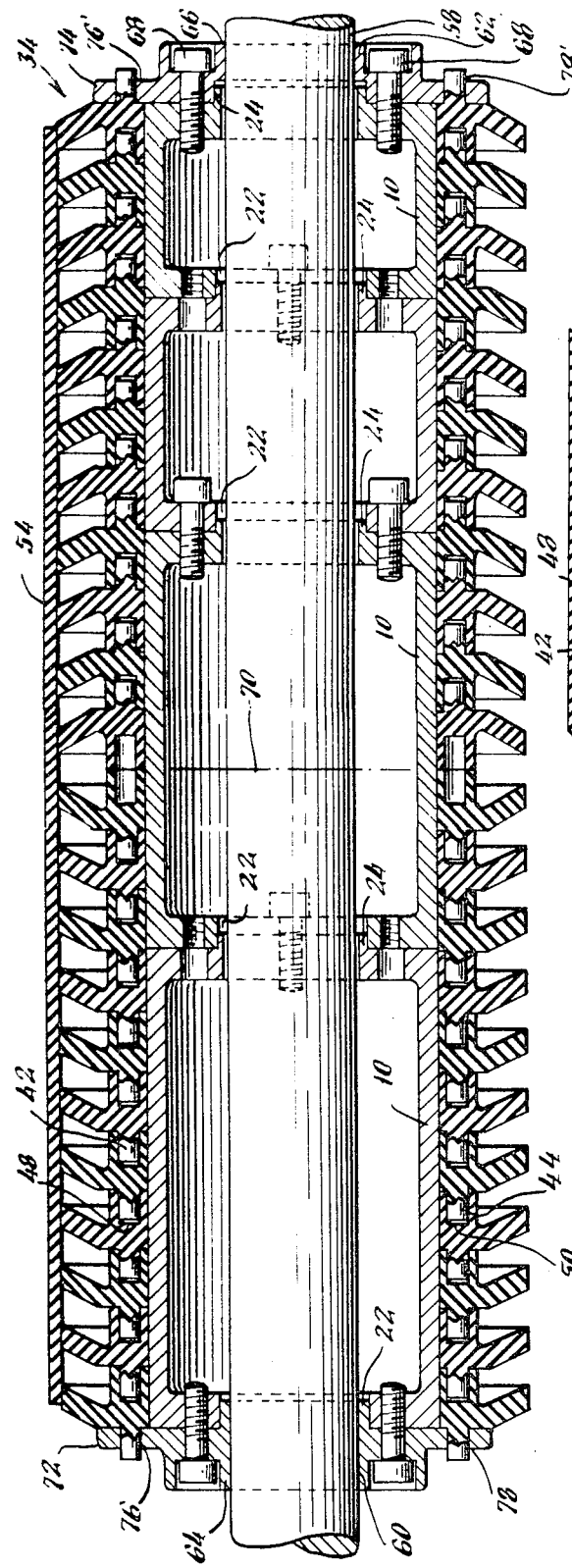
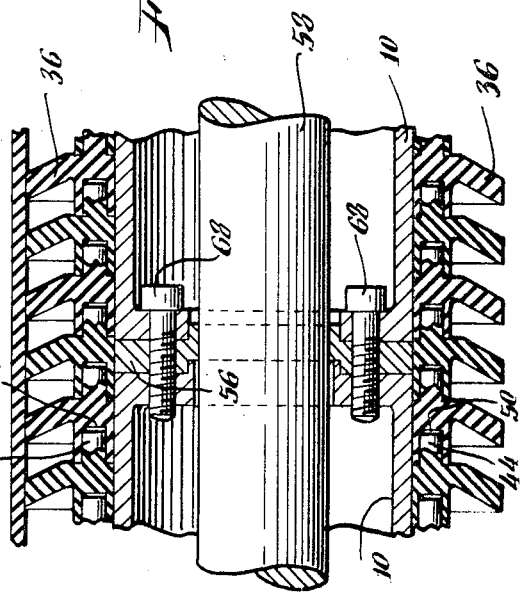
INVENTOR.
Carl A. Frank
BY
Robertson, Bryan, Parmelee & Johnson
ATTORNEYS.

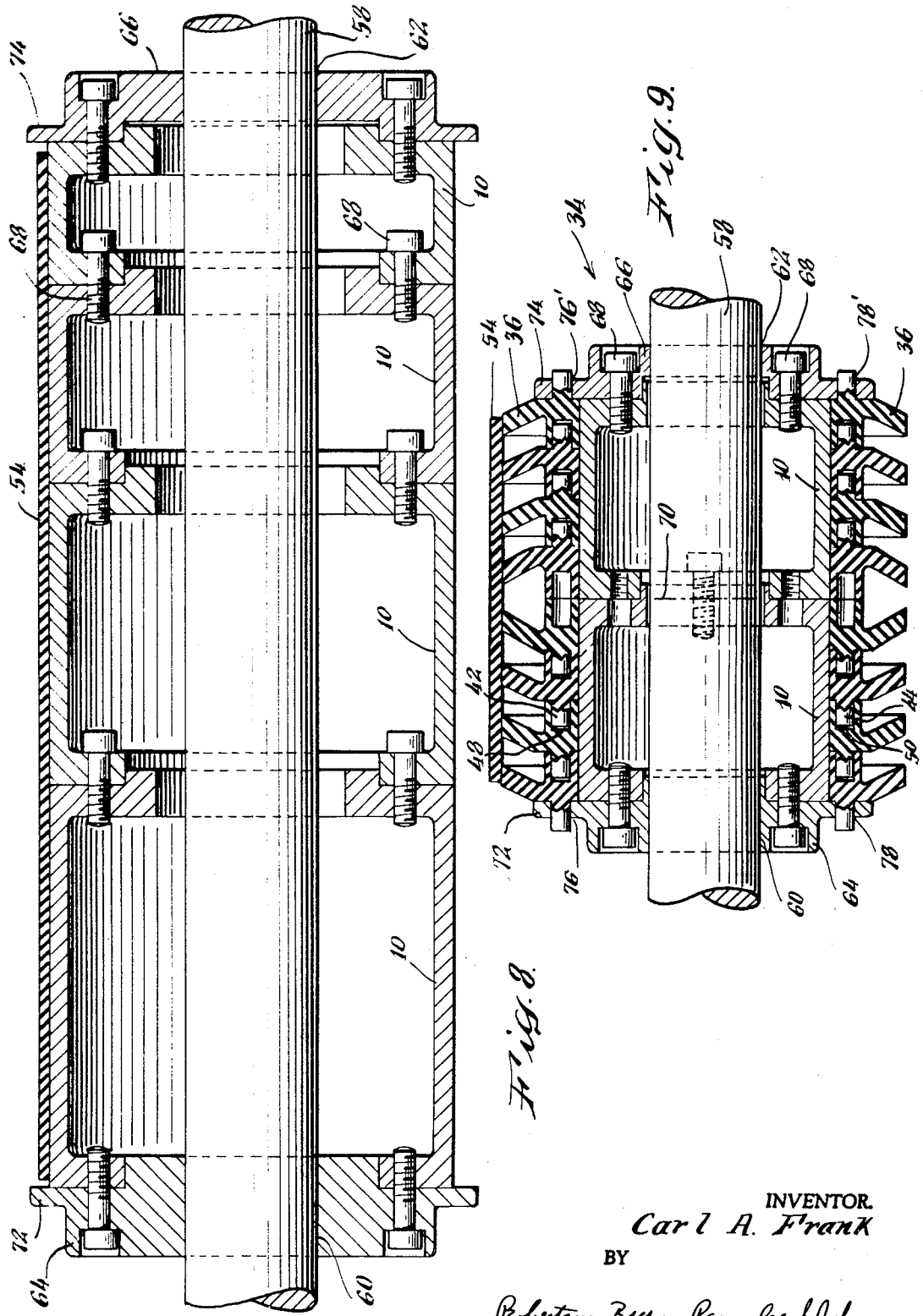

MODULAR PULLEY CAPABLE OF BEING ASSEMBLED TO VARIOUS DESIRED LENGTHS AND AUTOMATIC BELT-STEERING PULLEY ASSEMBLY

This application is a continuation of application Ser. No. 35,400, filed May 7, 1970, now abandoned.

This invention relates to a modular pulley capable of being assembled to various desired lengths and to an automatic belt-steering pulley assembly.

Various pulley constructions are utilized at present whereby cylindrical pulley bodies are drilled to be supported on the pulley shaft. The cylindrical pulley bodies are cast to standard sizes such that a manufacturer is limited to specified longitudinal lengths and usually finds it difficult and expensive to construct a pulley of a specified length as the need may arise, and this usually involves drilling and reaming the pulley body to fit the shaft.

It is among the advantages of the present invention that individual modular hub units may conveniently and quickly be interconnected to provide a "flat" pulley of any desired size over a large range of sizes as the need may arise. The hub units may be readily stocked by a manufacturer, as he is sure they will be used within a relatively short period of time.

Further, more rapid assembly of the pulley is made possible by having axially aligned holes arranged in the male and female end surfaces. This facilitates insertion of the bolting tool to interconnect the successive hub units.

A further advantage is that a plurality of resilient interlocking rings may be mounted around the assembled hub units providing automatic belt-steering action. These rings each include an effectively inclined peripheral rib which is resiliently deflectable as the belt passes over, thus serving to steer and center a belt automatically as will be described in detail. These rings are held by end plates mounted to the two respective end hub units of the assembled pulley or roller.

Additional objects, aspects and advantages of the present invention will be apparent when the detailed description is considered in conjunction with the accompanying drawings in which the figures are briefly described, as follows:

FIG. 1 is a partially broken side elevational view of a modular hub unit;

FIG. 2 is a partially broken front view of the hub unit;

FIG. 3 is a rear perspective view of one of the resilient interlocking automatic belt-steering or centering rings;

FIG. 4 is the front perspective view of this same resilient interlocking ring;

FIG. 5 is an enlarged partial sectional view showing the inclined peripheral rib of the resilient interlocking ring;

FIG. 6 is an axial sectional view of a completed pulley assembly, including the end plates and resilient interlocking belt-steering rings;

FIG. 7 is a partial cross-sectional view of a long pulley showing a shaft-seating ring;

FIG. 8 is an axial sectional view of a completed flat pulley assembly being used without the belt-steering rings; and FIG. 9 is a cross-sectional view of a dual hub unit and resilient belt-steering ring assembly for use with a relatively narrow belt.

Referring to FIGS. 1 and 2, an individual modular hub unit 10, preferably made from steel, is shown. This modular hub unit 10 includes a cylindrical body portion 12 having integrally connected female and male end surfaces 14 and 16. Openings 18 and 20, respectively, are axially arranged therein to readily receive a pulley shaft, for example, as shown in FIGS. 6, 7, 8 and 9. Adjacent to the periphery of the opening 18 is a female portion or socket 22 extending inwardly relative to the end surface 14. Adjacent to the periphery of the other opening 20 is a male portion or projection 24 extending outwardly relative to the end surface 16. In this illustrative embodiment of the invention, the female socket 22 is provided by enlarging the opening 18 relative to the size of the other opening 20.

Further, each end surface 14 and 16 of the hub unit 10 has four equally spaced and axially aligned holes 26, 28, 30 and 32 and 26', 28', 30' and 32', respectively. The four holes in each end surface 14 and 16 are equally spaced on a circle concentric about the axis 33 of the hub unit, and the respective holes 26 and 28, 30 and 32 in each end surface that are arranged 180° apart may for facility in description be considered as comprising a pair, i.e. 26 and 28 are a first pair one, 30 and 32 are a second pair, 26' and 28' are a first pair at the other end, and 30' and 32' are a second pair. One pair of holes in each end surface are tapped. However, the tapped holes in the respective end surfaces 14 and 16 are not axially aligned. For example, as shown in FIGS. 1 and 2, the first pair of holes in end surface 14, holes 26 and 28, are tapped, while in end surface 16, the second pair of holes, 30' and 32', are tapped. Moreover, the non-tapped holes are of larger diameter. Such an arrangement facilitates interconnection of individual hub units 10 to form a completely assembled pulley 34, see FIGS. 6 and 9, as will be discussed in greater detail below.

A resilient interlocking belt-steering ring 36 is shown in FIGS. 3, 4 and 5. The resilient ring 36 may be made of rubber or any other resilient material having substantially the same deflectable and resilient properties as rubber. The resilient ring 36 includes a center mounting portion 38 and a peripheral rib 40 projecting outwardly therefrom and effectively inclined. The resilient ring 36 further includes two integral projecting lug pins 42 and 44 spaced 180° apart on one radial face 46 of the center mounting portion 38 and two pin receiving holes 48 and 50 spaced 180° on the other radial face 52 of the center mounting portion 38. The hole 48 is directly aligned with the lug pin 42, and the hole 50 is directly aligned with the lug pin 44. This arrangement facilitates rapid interlocking assembly of a plurality of resilient rings 36 upon the assembled hub units, as shown in FIGS. 6, 7 and 9.

Referring to FIG. 5, it is noted that an obtuse angle is formed between the radial face 46 and the inclined face 47 of the rib 40. Moreover, the rib 40 is positioned immediately adjacent to the face 46. Conversely, an acute angle is formed between the inclined face 49 of the rib 40 and the cylindrical outer surface 51 of the mounting portion 38.

Thus, advantageously, the flat cylindrical periphery 53 of the inclined rib 40 is located centrally with respect to the mounting portion 38, as indicated by the dotted projection lines *a* and *b*. In this arrangement the mounting portion 38 provides a stable support for the belt-carrying surface 53.

As previously mentioned, FIG. 6 shows a completely assembled pulley 34 with a conveyor belt 54 positioned therearound. The individual hub units 10 are interconnected with the female and male portions 22 and 24, respectively, mating together to form a pulley of any desired length, as the case may be.

Generally, as the length of the pulley 34 increases, it is desirable to provide a shaft seating ring 56 to ride against the pulley shaft 58 (see FIG. 7). Normally, the shaft seats within openings 60 and 62 formed in the respective end plates 64 and 66, respectively. However, when utilizing a long pulley assembly, such as illustrated in FIGS. 6 and 8, or longer, it may be desirable to provide one or more additional intermediate seats 56 for the shaft 58 to maintain the hub units 10 in axially aligned relationship relative to one another in spite of the influence of the load applied by the conveyor belt 54.

When utilizing a seat ring 56, a male and female portion 24 and 22, respectively, of the axially aligned hub units 10 are joined together with the seating ring 56 interposed and clamped therebetween. As shown in FIG. 7, the seating ring 56 has male and female surfaces and is utilized to form a seat with the shaft 58.

The end plates 64 and 66, as shown in FIGS. 6 and 8, mate with the male portion or flange 24 and female portion 22, respectively. Thus, the end hubs 10 can be readily axially aligned with the end plates 64 and 66.

As shown in FIGS. 6, 8 and 9, it is to be further understood that it may be advantageous to provide individual modular hub units 10 of various longitudinal lengths so as to allow a user to select and assemble a pulley 34 having almost any longitudinal length he desires.

During assembly of the pulley 34, the hub units 10 are interconnected with machine screws or bolts 68; the interconnection being made rapidly and reliably by utilizing pairs of tapped and untapped holes in the end surfaces 14 and 16 of each hub 10. When assembling the pulley from left to right, as shown in FIG. 6, the tapped holes 30' and 32' of one hub 10 are axially aligned with integral holes 30 and 32 of an adjacent hub 10. such an axial alignment allows a tool to be readily inserted through axially aligned holes 30' and 32' in the adjacent hub to reach the bolts 68 to make a rapid interconnection of one hub 10 to the adjacent hub 10. The bolts 68 have their heads located adjacent the untapped holes so that when the bolt 68 is tightened in the tapped hole a secure interconnection of hubs 10 is achieved. Further, the bolts 68 are provided alternately 90° out of phase at each successive hub interconnection providing a rigid, interlocking pulley 34.

It may be advantageous to utilize four bolts 68 when utilizing a seating ring 56, as shown in FIG. 7. This arrangement will more rididly hole the seating ring 56 against the shaft 58. In this event, the other pair of machine screws 68 are inserted from the opposite side.

Modular resilient interlocking, belt-steering rings 36, as shown in FIGS. 3 and 4, are mounted upon the assembled hub units to form the automatic belt-steering pulley 34. The desired number of resilient interlocking rings 36 are chosen to correspond to the desired pulley length. Adjacent pins 42 and 44, and holes 48 and 50, of each preceding ring 36, are mated to form an interlocking roll. The inclined outwardly extending ribs 40 of all the rings 36 on the left and right of the transverse center 70 of the pulley 34 are inclined inwardly toward the transverse center 70, see FIGS. 6 and 9.

With the ribs 40 so arranged around the assembled hub units 10, a load placed on the conveyor belt 54 will act thereon to deflect the inclined ribs to create reaction forces in thr ribs 40 tending to steer and thus to center the belt 54 should it tend toward misalignment.

Further, the end plates 64 and 66 have flanges 72 and 74, respectively, for longitudinal retention of the rings 36, to aid in maintaining the rings in their interlocked relationship. The flanges 72 and 74 may have pin-receiving holes 76 and 78, and 76' and 78', respectively, arranged therein for interlocking reception of pins 42 and 44.

Advantageously, as shown most clearly in FIG. 5, the obtuse angled sloping surface 47 is offset toward the radial face 46, so that the rib periphery 53 is centrally positioned relative to the mounting portion 38. This central positioning is shown by the radially extending dotted lines in FIG. 5.

It may be desirable to have the belt 54 positioned in direct contact with the hubs 10, e.g. when the belt 54 is carrying very heavy loads or for other applications where a flat or cylindrical pulley is used as shown in FIG. 8.

It should be understood that various additional modifications may be made in the hub units 10 and rings 36, including dimensional changes, without departing from the spirit or scope of the invention as described herein or expressed in the appended claims.

I claim:

1. A modular hub unit capable of being utilized with any desired number of mating hub units to construct pulleys having various desired predetermined lengths, said hub unit comprising: a cylindrically-shaped body portion, end surfaces integrally connected with said body portion, each end surface having axially aligned orifices extending each end surface having axially aligned orifices extending therethrough capable of receiving a shaft, one of said end surfaces having a male portion extending outwardly therefrom adjacent to said axially aligned orifice arranged therein, the other of said end surfaces having a female portion extending inwardly therefrom, said end surfaces further having axially aligned holes arranged therein at spaced positions about the axis of said hub unit whereby individual hubs may be interconnected together, the male portion of one hub unit mating with the female portion of the adjacent hub unit, adjacent hub units being bolted together to form a pulley of desired length, the tool doing the bolting being insertable through one axially aligned hole to tighten a bolt in the preceding hole.

2. A modular hub unit capable of being utilized with any desired number of mating hub units to construct pulleys having various desired predetermined lengths as recited in claim 1, in which: said male portion extending outwardly from said one end is a flange circumscribing said orifice, said female portion extending inwardly from said other end is an enlargement of said other orifice sufficient to receive such a flange, whereby adjacent hubs may be mounted together in succession.

3. A modular hub unit capable of being utilized with any desired number of similar mating hub units to construct pulleys having various desired predetermined lengths, as recited in claim 1, wherein each of said end surfaces has four equally spaced holes positioned therein, each hole in one end surface being axially aligned with an opposing hole in the other end surface, the pair of said two holes which are spaced 180° apart in said one end surface forming a first pair and the remaining two holes spaced 180° apart forming a second pair, said first pair being threaded for receiving machine screws therein, the holes spaced 180° apart in the other end surface forming third and fourth pairs, said third pair being axially aligned with said first pair and said fourth pair being axially aligned with said second pair, said fourth pair further being threaded for receiving machine screws therein, whereby as said adjacent hubs are secured together, the machine screws are fastened alternately to the first and third pairs of preceding threaded holes, access being gained thereto through the vacant hole axially aligned with the head of the machine screw.

4. A modular pulley capable of being assembled to various longitudinal lengths, comprising: a plurality of interconnected hub units, each hub unit having a cylindrically-shaped body portion, end surfaces integrally connected therewith, each end surface having axially aligned orifices extending therethrough capable of receiving a shaft, one end surface having a male portion extending outwardly therefrom adjacent to said axially aligned orifice arranged therein, the other end surface having an orifice enlarged sufficiently to receive such a male portion, said end surfaces further having axially aligned holes arranged therein spaced about the axis of the hub unit, whereby individual hub units may be interconnected together by fastening means engaging said holes, the male portions of one hub unit mating with the end surface and orifice of the preceding hub unit, said adjacent hub units then being secured together forming a pulley, the tool for doing the fastening gaining access to the fastening means through another axially aligned hole.

5. A modular pulley capable of being assembled to various longitudinal lengths as recited in claim 4, including end plates fastened to the end surface of the respective end hub units, said end plates including a flange portion, a plurality of flexible rotatable rings, each having at least one resilient peripheral rib, said rib projecting outwardly at an inclination from a cylindrical body, said rings being axially positioned adjacent one another around siad hub units and being retained by said flanges, and the peripheral ribs being inclined inwardly toward the center of the pulley.

6. A modular pulley capable of being assembled to various longitudinal lengths as claimed in claim 4, comprising end plates fastened to the end surfaces of the respective end hub units, the respective end plates including male and female mating portions, and said end plates having openings therein smaller than the openings in said hub units for seating upon a shaft inserted through said modular pulley.

7. A modular pulley capable of being assembled to various longitudinal lengths as recited in claim 5, in which a seating ring is included at an intermediate portion of said modular pulley, said seating ring having male and female mating surface to be sandwiched between a pair of adjacent hub units, said seating ring having an opening therein of the same size as said end plates for seating upon the shaft to provide support for the intermediate portion of said modular pulley.

8. A modular pulley capable of being assembled to various longitudinal lengths as recited in claim 4, wherein a plurality of interlocking rings, each having at least one resilient peripheral rib projecting outwardly at an inclination from a cylindrical body, are positioned around said modular pulley to rotate therewith, half of said rings having their peripheral ribs extending outwardly inclined in one direction toward the center of the pulley and the remaining half of said rings having their peripheral ribs extending outwardly inclined in the opposite direction toward the center of the pulley whereby said ribs aid in centering a belt passing thereover.

9. A modular pulley capable of being constructed to various longitudinal lengths, as recited in claim 4, wherein said male portion extending outwardly from said one end is a flange circumscribing said opening, said female portion is an enlargement of said other opening whereby adjacent hubs may be interconnected in succession with said flanges fitting within said enlarged openings in succession.

10. A modular pulley capable of being constructed to various specific longitudinal lengths, as recited in claim 4, wherein each of said end surfaces of said hub units has four holes equally spaced about the axis, each hole in one end surface being aligned with an opposing hole in the other end surface, the two holes which are spaced 180° apart in one end surface forming a first pair and the remaining two holes spaced 180° apart forming a second pair, said first pair being threaded for mounting machine screws thereto, said two holes spaced 180° apart in said other surface forming a third and fourth pairs of holes, said third pair being axially aligned with said first pair, and said fourth pair being axially aligned with said second pair, said fourth pair further being threaded for mounting machine screws thereto, whereby as said adjacent hub units are secured with machine screws alternately being fastened to the first and third pairs, said threaded holes are positioned to provide an access route for the tool through the vacant hole aligned with the threaded hole having the machine screw positioned therein.

11. A resilient one-piece self-supporting belt-steering ring made entirely of rubber or similar resilient material adapted to be manually assembled upon a cylindrical pulley roll together with other similar belt-steering rings for steering a wide, flat belt with respect to the pulley roll comprising an inner cylindrical ring mounting portion adapted to be manually slidable onto and to encircle the pulley roll, said ring mounting portion having an integral peripheral rib projecting outwardly from a first axial end of said cylindrical ring mounting portion, said ring mounting portion having a greater axial length than the axial length of said peripheral rib, said rib extending outwardly from said first end of said cylindrical ring mounting portion and being inclined in an axial direction toward the second axial end of cylindrical ring mounting portion, said inclined peripheral rib being resiliently deflectable, the belt-engageable periphery of said rib being axially displaced from said first end such that said periphery is located surrounding the ring mounted portion and said cylindrical ring mounting portion having a pair of radial faces at the first and second opposite axial ends thereof, an obtuse angle being formed as seen in cross section between said first one of said radial faces and one inclined face of said peripheral rib, and an acute angle being formed as seen in cross section between the other inclined face of said rib and the other cylindrical surface of said ring mounting portion, with the belt-engageable periphery of the rib being centrally located around said cylindrical ring mounting portion providing a stable support for the belt-engageable periphery of said rib.

12. A belt-steering pulley assembly comprising an elongated cylindrical pulley roll, a plurality of identical resilient one-piece self-supporting belt-steering rings each made entirely of rubber, or similar resilient material mounted on said roll, each of said belt-steering rings comprising an inner cylindrical ring mounting portion fitting onto and encircling said roll, each of said ring mounting portions having a pair of radial end faces, said cylindrical mounting portions being mounted on said roller adjacent to each other with their radial end faces in abutting contact with each other, a pair of end plates removably mounted on opposite ends of said pulley roll, said end plates clamping the cylindrical mounting portions of respective rings adjacent to each other in said abutting contact, each of said cylindrical mounting portions having an integral peripheral rib projecting outwardly therefrom with a belt-engageable periphery on the rib, each of said ring mounting portions having an axial length greater than the axial thickness of the rib thereon and the rib projecting outwardly from a position on its integral ring mounting portion which is axially offset toward a first end thereof, each of said ribs being inclined outwardly in an axial direction toward the second end of the cylindrical mounting portion of the ring itself and being resiliently deflectable, the belt-engageable periphery of each rib surrounding the intermediate part of the cylindrical mounting portion of the ring itself, the sloping surface of each rib facing toward said second end defining an acute angle with the outer cylindrical surface of the integral ring mounting portion, said abutting cylindrical mounting portions of the respective rings on the pulley assembly serving to axially space the belt-engageable peripheries of the respective ribs apart in said pulley assembly, and said rings being mounted on either side of the center of said roll with their ribs respectively inclined inwardly toward the center of the roll.

* * * * *